United States Patent
Lopatin et al.

(10) Patent No.: US 11,340,126 B2
(45) Date of Patent: May 24, 2022

(54) CORROSION-PROTECTION ELEMENT FOR A FIELD DEVICE

(71) Applicant: Endress+Hauser SE+Co. KG, Maulburg (DE)

(72) Inventors: Sergey Lopatin, Lörrach (DE); Thomas Uehlin, Schopfheim (DE); Michael Hügel, Lörrach (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 239 days.

(21) Appl. No.: 16/629,094

(22) PCT Filed: Jun. 19, 2018

(86) PCT No.: PCT/EP2018/066270
§ 371 (c)(1),
(2) Date: Jan. 7, 2020

(87) PCT Pub. No.: WO2019/007677
PCT Pub. Date: Jan. 10, 2019

(65) Prior Publication Data
US 2020/0200632 A1    Jun. 25, 2020

(30) Foreign Application Priority Data

Jul. 7, 2017 (DE) ..................... 10 2017 115 250.4

(51) Int. Cl.
*G01L 19/06* (2006.01)
*C23F 13/00* (2006.01)
(Continued)

(52) U.S. Cl.
CPC ............ *G01L 13/026* (2013.01); *C23F 13/10* (2013.01); *C23F 13/14* (2013.01); *G01L 19/0627* (2013.01); *G01L 19/0654* (2013.01)

(58) Field of Classification Search
CPC .. G01L 19/06; G01L 19/0627; G01L 19/0645; G01L 19/0654; G01L 13/02;
(Continued)

(56) References Cited

U.S. PATENT DOCUMENTS 3,994,794 A     11/1976   Bohne
4,472,969 A *   9/1984    Templin ................. G01F 23/72
                                                    338/33
(Continued)

FOREIGN PATENT DOCUMENTS

CN          2313577 Y      4/1999
CN          2443006 Y      8/2001
(Continued)

OTHER PUBLICATIONS

Wikipedia, Cathodic protection, https://en wikipedia.org/w/index. php?title=Cathodic_protection&oldid=787520353, 12 pp. (last updated 21:33, Jun. 25, 2017; last accessed Nov. 9, 2018 12:15).
(Continued)

*Primary Examiner* — Herbert K Roberts
(74) *Attorney, Agent, or Firm* — Mark A. Logan; Endress+Hauser (USA) Holding Inc.

(57) ABSTRACT

A corrosion protection element is described, with which in simple and cost effective manner a reliable corrosion protection of field devices can be provided, which field devices comprise at least one component of stainless steel in contact with an environment of the field device. Corrosion protection elements of the invention are distinguished by features including that they are embodied as sacrificial anodes comprising iron or rustable steel and have a form, which is embodied in such a manner that they can be applied to the component of the field device in such a manner that the sacrificial anode is in electrically conducting contact with the component.

5 Claims, 4 Drawing Sheets

(51) Int. Cl.
*G01L 13/02* (2006.01)
*C23F 13/10* (2006.01)
*C23F 13/14* (2006.01)

(58) Field of Classification Search
CPC ... G01L 13/026; G01L 19/142; G01L 19/143; G01L 19/144
See application file for complete search history.

(56) References Cited

U.S. PATENT DOCUMENTS

| | | | |
|---|---|---|---|
| 7,448,275 B1 * | 11/2008 | Sundet | G01L 13/025 73/706 |
| 2010/0252424 A1 | 10/2010 | Amano et al. | |

FOREIGN PATENT DOCUMENTS

| CN | 1756656 | A | * | 4/2006 | ............ B32B 15/08 |
|---|---|---|---|---|---|
| CN | 1756656 | A | | 4/2006 | |
| CN | 200955067 | Y | | 10/2007 | |
| CN | 201158708 | Y | | 12/2008 | |
| CN | 201158708 | Y | * | 12/2008 | |
| CN | 101427036 | A | | 5/2009 | |
| CN | 201648522 | U | | 11/2010 | |
| CN | 202492582 | U | | 10/2012 | |
| CN | 202898547 | U | | 4/2013 | |
| CN | 203077900 | U | | 7/2013 | |
| CN | 203831271 | U | | 9/2014 | |
| CN | 205313667 | U | | 6/2016 | |
| CN | 105764733 | A | | 7/2016 | |
| CN | 205934017 | U | | 2/2017 | |
| DE | 2548377 | A1 | | 5/1977 | |
| DE | 10347861 | A1 | | 4/2005 | |
| EP | 1710545 | A1 | | 10/2006 | |
| FI | 86442 | B | * | 5/1992 | |
| JP | 11323581 | A | | 11/1999 | |
| JP | 2000045085 | A | | 2/2000 | |

OTHER PUBLICATIONS

Emerson Process Management, Material Selection and Compatibility Considerations for Rosemount® Pressure Transmitters, Technical Note, 00840-0100-3045, Rev BA, Sep. 2015, 24 pp.
Rosemount Pressure Transmitters, Sep. 30, 2015, Emerson Material Selection and Compatibility Considerations for Rosemount PressureTransmitters, 4-5, 1-15.

* cited by examiner

CORROSION-PROTECTION ELEMENT FOR A FIELD DEVICE

CROSS-REFERENCE TO RELATED APPLICATIONS

The present application is related to and claims the priority benefit of German Patent Application No. 10 2017 115 250.4, filed on Jul. 7, 2017 and International Patent Application No. PCT/EP2018/066270, filed on Jun. 19, 2018, the entire contents of which are incorporated herein by reference.

TECHNICAL FIELD

The invention relates to a corrosion protection element for a field device, which has at least one component of stainless steel, especially austenitic stainless steel, in contact with an environment of the field device, as well as to a field device equipped with at least one such corrosion protection element.

BACKGROUND

Field devices are applied in industrial measurements technology, especially in process and automation technology, among other things, for metrological registering of process relevant, measured variables. These field devices comprise, among others, sensors, transmitters, measuring transducers, as well as measuring devices of the most varied of types, such as are applied e.g. for metrological registering, measuring and/or monitoring of measured variables.

Field devices include, among others, pressure difference measuring transducers, such as described e.g. in DE 103 47 861 A1. Such measuring transducers comprise a measuring element, which is held between two flanges arranged on mutually opposite, external sides of a measuring element body of the measuring element. For this, the flanges are connected with one another by screws, each of which has between the flanges a region, which is exposed and in contact with the environment of the measuring transducer. Additionally, these measuring transducers include a pressure difference sensor, which is contactable with the two pressures, whose difference is to be measured, via two diaphragm seals connected in front of the sensor. The diaphragm seals are terminated outwardly, in each case, by an isolating diaphragm welded to a periphery of the measuring element body. The pressure loading via the isolating diaphragms occurs, in each case, via, connectable to a differential pressure line, a pressure transfer passageway, which extends through its associated flange to a pressure chamber located within the flange and adjoining its isolating diaphragm.

Just as in the case of a large number of other field devices, also pressure difference measuring transducers can be exposed during operation to comparatively high mechanical loadings. Thus, diaphragm seals, same as pressure- or pressure difference measuring transducers, are, in given cases, exposed to very high pressures, which must be transmitted and measured. Pressure difference measuring transducers must, moreover, depending on application, in given cases, withstand very high static pressures, on which the pressure difference to be measured is superimposed. Furthermore, as much as possible, they should be able to withstand one sided pressure overloading, of magnitudes e.g. up to 200 bar or even up to 650 bar.

A high mechanical durability of field devices in the present state of the art is usually achieved by producing at least their mechanically highly loaded components, such as e.g. housing, process connections, securement means, measuring element body, etc., of pressure resistant, mechanically stable metals. Suited for this are especially stainless steels. In such case, austenitic stainless steels offer the additional advantage of a certain ductility, which protects components produced therefrom especially also against stress cracks in the case of suddenly arising overloads. Austenitic stainless steels are today, among other things, also applied for manufacture of the isolating diaphragms of diaphragm seals.

There are applications, in which field devices are exposed to a corrosive environment, as a result of which components of stainless steel coming in contact therewith are attacked by corrosion. Relevant in such case are, among others, humid, salt containing environments, such as occur e.g. in off-shore plants or in plants operated by applying sea water or other salt- and/or chloride-containing liquids, especially at higher temperatures. E.g. components of austenitic stainless steel can be attacked by corrosion in such environments. Corrosive environments bring about pitting corrosion, for instance. Moreover, in the case of field devices, which have narrow gaps exposed to a corrosive environment, crevice corrosion can occur and welded seams attacked.

Thus, in the case of the above mentioned pressure difference measuring transducers, e.g. the flanges and the measuring element contacting the environment can be attacked e.g. by pitting corrosion. Moreover, crevice corrosion starting externally can lead to penetration by the corrosive environment from the outside between one of the flanges and the measuring element, and, in given cases, reaching even a pressure chamber, where it comes in contact with the isolating diaphragm and the weld seam connecting the isolating diaphragm with the measuring element. The latter can with time lead to the pressure chambers and/or the diaphragm seals becoming unsealed, which, depending on location of use, can have serious consequences.

As the example shows, corrosion of components of stainless steel can considerably damage a field device and, in given cases, even lead to total failure of the field device. Correspondingly, field devices, which have components of stainless steel, should not be applied in corrosive environments, which corrode the stainless steel.

In order to achieve a higher corrosion resistance, components of field devices exposed to corrosive environments can be made of more corrosion resistant, duplex- or super-duplex steels. These materials are, however, more expensive than austenitic stainless steel types and mechanically significantly harder to work. The latter feature leads especially in the case of production of components to be worked by machining to comparatively high production costs.

SUMMARY

It is an object of the invention to provide a reliable, simply applied, cost effective corrosion protection for field devices.

For this, the invention resides in a corrosion protection element for a field device,
wherein the field device includes a component of stainless steel, especially austenitic stainless steel, which contacts an environment of the field device,
characterized in that
the corrosion protection element is embodied as a sacrificial anode comprising iron or a rustable steel and is formed in such a manner that the corrosion protection element can be applied to the component of the field device in such a manner that the sacrificial anode is in electrically conducting contact with the component.

Corrosion protection elements of the invention offer the advantage that sacrificial anodes comprising iron and/or a rustable steel provide a high-grade cathodic corrosion protection of components of stainless steel, especially austenitic stainless steel. Moreover, they offer the advantage that they not only protect the component, on which they are applied, but, also, simultaneously also provide a cathodic corrosion protection for all additional components of the field device, which are of stainless steel or other metal more noble than iron or rustable steel and which are in electrically conducting contact with the corrosion protection element and/or the component equipped with the corrosion protection element. Therewith, also components can be protected, on which e.g. for space reasons no corrosion protection element can be placed. Included here are especially also components, which adjoin narrow gaps present in the field device and which can come in contact with the corrosive environment at the location of use of the field device.

Moreover, iron and rustable steel are cost effective, easily worked materials, from which bodies are manufacturable with forms freely selectable within very wide limits. That offers the advantage that the forming of the corrosion protection elements of the invention can be adapted without problem to the shape of components present in the field device. In this way, also already existing field devices or field devices even already in use can be subsequently retrofitted with corrosion protection elements of the invention and/or worn-out corrosion protection elements can be replaced after use on a component of a field device.

A first further development is characterized by features including that the corrosion protection element is embodied as an element, which can be slid, plugged or clamped onto the component.

A second further development is characterized by features including that the corrosion protection element comprises a body, especially a one piece body, of iron or a rustable steel.

A third further development is characterized by features including that the body is coated with a coating of a coating material suitable for cathodic corrosion protection of stainless steel.

A further development of the third further development is characterized by features including that the coating material comprises zinc.

Further developments of the third further development or its further development are distinguished by features including that
the body has a material thickness in the order of magnitude of 0.2 mm to 3 mm, especially 0.3 mm to 1 mm, and/or
the coating has a layer thickness in the order of magnitude of 20 µm to 50 µm.

A fourth further development is characterized by features including that the corrosion protection element comprises a sleeve, which can be slid onto the component, wherein the corrosion protection element is embodied especially as a one piece, sleeve-shaped element, which can be slid onto the component.

A fifth further development is characterized by features including that the corrosion protection element comprises a spring clamp, which can be plugged or clamped onto the component, wherein the corrosion protection element is embodied especially as a one piece, spring clamp shaped, corrosion protection element (3), which can be plugged or clamped onto the component.

Furthermore, the invention resides in a field device equipped with at least one corrosion protection element of the invention, characterized in that each provided corrosion protection element is applied to a component of the field device of stainless steel, especially austenitic stainless steel, in contact with an environment of the field device.

A first further development of the field device is characterized by features including that the one or more corrosion protection elements comprise
at least one corrosion protection element slid onto an elongated component, wherein the corrosion protection element comprises a sleeve or is embodied with a sleeve shape, and wherein the corrosion protection element externally surrounds at least one region of the component, and/or,
plugged or clamped onto an externally accessible component, at least one corrosion protection element, which comprises a spring clamp or is embodied as a one piece, spring clamp shaped, corrosion protection element with two spring legs, which grip around at least one region of the component.

A further development of the latter further development is characterized by features including that on both sides of the region of the component, a limiter is provided, which is embodied in such a manner that it limits an axial movement of the corrosion protection element applied on the region in a direction extending in parallel with the longitudinal axis of the region.

A second further development of the field device is characterized by features including that at least one of the provided components has a tapered region, on which a corrosion protection element comprising a spring clamp or embodied as a one piece, spring clamp shaped, corrosion protection element is plugged or clamped in such a manner that it externally grips the tapered region.

A third further development of the field device is characterized by features including that the field device comprises at least one further component of stainless steel, especially austenitic stainless steel, or a metal more noble than iron or rustable steel protected against corrosion by at least one of the provided corrosion protection elements, wherein the further component is in electrically conducting contact with at least one of the components equipped with one of the corrosion protection elements and/or the corrosion protection element mounted on such component.

A fourth further development of the field device is characterized by features including that
the field device comprises a pressure difference transducer,
the pressure difference transducer includes a measuring element clamped between two flanges connected with one another by screws,
each of the screws includes a region lying exposed between the flanges and in contact with the environment, and
one of the provided corrosion protection elements is placed on the region of at least one of the screws in contact with the environment.

A fifth further development of the field device for metrological registering, for measuring and/or for monitoring of a measured variable of a fill substance located in a container is characterized by features including that
the field device comprises a part to be arranged outside of the container and a part to be arranged within the container,
at least one of the two parts includes a component, especially a housing, on which a corrosion protection element is placed, wherein the corrosion protection element is especially a corrosion protection element plugged or clamped on a tapered housing section of the housing.

BRIEF DESCRIPTION OF THE DRAWINGS

The invention and other advantages will now be explained in greater detail based on the figures of the appended drawing, in which two examples of embodiments are shown. Equal elements are provided in the figures of the drawing with equal reference characters. The figures of the drawing show as follows.

DETAILED DESCRIPTION

The invention comprises corrosion protection elements for field devices, which have at least one component of stainless steel for contact with an environment of the field device. Corrosion protection elements of the invention are distinguished by features including that they are embodied as sacrificial anodes comprising iron or rustable steel and have a form, which is embodied in such a manner that they are placeable in such a manner on the component of the field device that the sacrificial anode is in electrically conducting contact with the component.

In reference to the electrically conducting contact, it is sufficient that the sacrificial anode and the component, on which the corrosion protection element is placed, are in contact at least at one location.

Iron and rustable steel are, as regards the electrochemical electromotive series, base materials as compared with stainless steel. In use in a corrosive environment, the corrosion protection element, applied on the component of the field device, thus forms a component of a primary cell, which comprises the sacrificial anode as anode and, as cathode, the component composed of the stainless steel, which is more noble in comparison with iron or rustable steel. Because of the assembly of the corrosion protection element on the component, thus, a cathodic corrosion protection of the component is achieved, which remains until the sacrificial anode is consumed by corrosion.

This cathodic corrosion protection extends simultaneously also to other components of the field device, in given cases, present, in contact with the corrosive environment, composed of stainless steel or other metals more noble than iron or rustable steel and in electrically conducting contact with the sacrificial anode and/or the component.

In this way, especially for components, as well as, in given cases present, other structural parts of the field device, of austenitic stainless steel, such as e.g. the austenitic stainless steel known under the material designation 304 or the austenitic stainless steel known under the material designation 316L, a high-grade corrosion protection is achieved.

With regard to an as simple as possible mountability, the corrosion protection elements are preferably embodied as elements slid, plugged or clamped onto the component of the field device.

Figure 1:
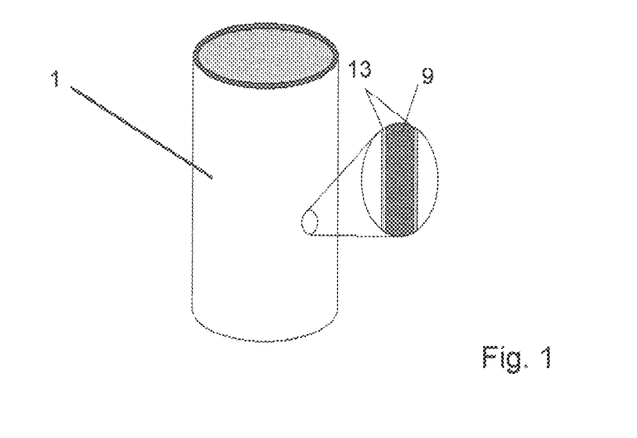
FIG. 1 shows a corrosion protection element embodied as a sleeve.

FIG. 1 shows, for this, an example of an embodiment of a corrosion protection element 1 of the invention, which comprises a sleeve to be slid onto a component of a field device. Such corrosion protection elements 1 are preferably embodied as one piece, sleeve shaped elements that are slid onto the component. This offers the advantage that the corrosion protection elements can be produced in cost effective manner from a tube of iron or rustable steel.

Alternatively, corrosion protection elements of the invention can comprise a spring clamp plugged or clamped on the component. This form of embodiment offers the advantage that the spring clamp can be plugged or clamped on an externally accessible component of a field device, without that at least one end of the component must be freely accessible for this. This facilitates not only the application and replacement of the corrosion protection element, but also the retrofitting of existing field devices, in given cases, even field devices already in use, with these corrosion protection elements 3.

Figure 2:
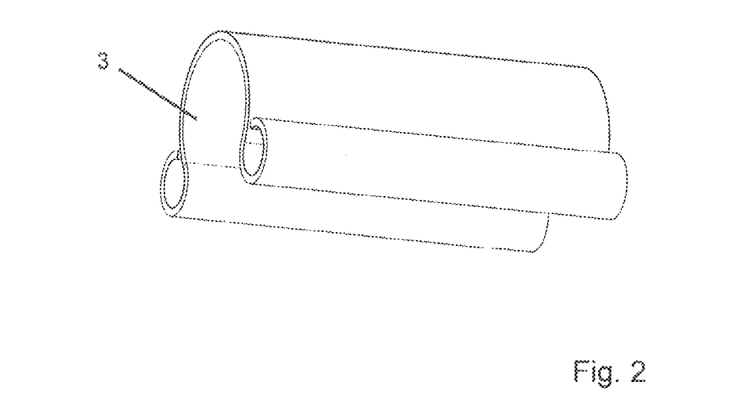
FIG. 2 shows a view of a corrosion protection element in the form of a spring clamp.
Figure 3:
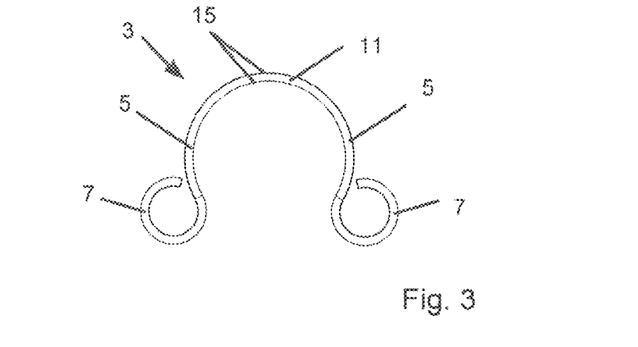
FIG. 3 shows the corrosion protection element of FIG. 2 in section.

FIG. 2 shows a view of an example of an embodiment of such a corrosion protection element 3. FIG. 3 shows the corrosion protection element 3 of FIG. 2 in section. As evident from FIG. 3, the spring clamp includes two spring legs 5, which are formed in such a manner that the clamp can be opened wide enough, such that the corrosion protection element 3 can be plugged or clamped onto the component. Corrosion protection elements 3 comprising a spring clamp can be embodied as a clip pluggable externally onto the, or a, region of the component. In such case, the spring legs 5 grip around the region of the component, onto which it was plugged on. Alternatively, it can be embodied as a clamp-on spring, between whose spring legs the component, or a region of the component, is clamped in the clamped on state.

Corrosion protection elements 3 comprising a spring clamp are preferably embodied as one piece, spring clamp shaped elements. In that case, there can be formed on the free ends of the spring legs 5 optionally, in each case, an outwardly pointing projection 7, which facilitates the manual assembly and removing of the corrosion protection element 3.

Single part, spring clamp shaped, corrosion protection elements 3 offer the advantage that they can be produced in simple and cost effective manner by punching and bending out of a sheet of iron or a rustable steel.

Alternatively, instead of the one piece corrosion protection elements 1, 3 illustrated in FIGS. 1 to 3, however, also multipart corrosion protection elements can be applied. An example for this are corrosion protection elements, which comprise a multipart spring clamp, which comprises rigid or resilient spring legs connected with one another by means of a clamping spring.

Corrosion protection elements 1, 3 of the invention can be totally of iron or rustable steel. Preferably, they comprise, however, a body 9, 11 from iron or rustable steel providing the shape of the corrosion protection element 1, 3, on which a coating 13, 15 of a coating material suitable for cathodic corrosion protection of the component, as well as the, in given cases, present, additional components. This variant offers the advantage that the coating material can be selected essentially independently of the requirements for mechanical properties of the corrosion protection element 1, 3, as provided by the body 9, 11.

Preferably zinc or a zinc containing material is applied as coating material. This coating material can be applied e.g. galvanically or by immersion of the body 9, 11 in molten zinc.

The coatings 13, 15 have preferably a layer thickness in the order of magnitude of 20 µm to 50 µm. This comparatively small layer thickness enables use of also comparatively brittle coating materials, such as e.g. zinc or zinc containing materials. In the comparison therewith, the body 9, 11 providing the mechanical properties of the corrosion protection element 1, 3 preferably has a material thickness in the order of magnitude of 0.2 mm to 3 mm, especially 0.2 mm to 1 mm. Depending on form of construction and field of application, however, also bodies with a greater material thickness and/or coatings with a greater layer thickness can be applied.

In the case of use of coated corrosion protection elements 1, 3, firstly, the coating 13, 15 is attacked and corroded off. In such case, the component, on which the corrosion protection element 1, 3 is placed, as well as the, in given cases, present, additional components of the field device, which are cathodic in the redox-process, are protected against corrosion. As soon as the coating 13, 15 is completely consumed, another anodic reaction occurs, in the case of which the body 9, 11 is oxidized. In such case, rust like oxidation products arise. Also in this phase, the component, as well as the, in given cases, present, other components, are protected by the body 9, 11 against corrosion. This protection remains until also the body 9, 11 is consumed, or corroded off or through.

The coating 13, 15 offers the advantage that it provides a like new corrosion protection element 1, 3 appearance. Moreover, zinc coated corrosion protection elements 1, 3 do not oxidize when they are in a warehouse. Thus, the like new corrosion protection elements 1, 3 not only look better, they also at the same store better.

Coated corrosion protection elements 1, 3 offer the additional advantage that the absence of the coating 13, 15 removed by corrosion, as well as the forming of the externally visible reaction products, such as e.g. reddish rust, arising from oxidation of the body 9, 11, form indicators, which display that the corrosion protection element 1, 3 has been exposed to a corrosive environment.

The condition of a corrosion protection element 1, 3 in use is preferably regularly checked and the corrosion protection element 1, 3 replaced, when required.

Besides the corrosion protection elements 1, 3, the invention also includes field devices with at least one component of stainless steel equipped with a corrosion protection element 1, 3 of the invention and in contact with the environment. In such case, the component is preferably a component present in any event in the field device. Suited for this are especially components, which are not only in contact with the environment, but also are supplementally externally visible. This offers the advantage that the state of the corrosion protection element 1, 3 applied thereon can be visually checked at any time.

Field devices can comprise e.g. at least one elongated component, which includes an elongated region, onto which a corrosion protection element 1 comprising a sleeve is slid. In that case, the field device includes preferably two limiters arranged at the two ends of the elongated region. The limiters are embodied in such a manner that they limit an axial movement of the corrosion protection element 1 on the region in a direction extending in parallel with the longitudinal axis of the component. In the case of this variant, the corrosion protection element 1 is placed before the second limiter is provided. Preferably, at least one of the two limiters is embodied as a removable limiter. That offers the advantage that the corrosion protection element 1, when required, can be replaced by first removing the limiter, replacing the corrosion protection element 1 and then putting the limiter back on.

Alternatively or supplementally, the field device can include at least one externally accessible component, which has a region, onto which a corrosion protection element 3 having a spring clamp can be plugged or clamped. If the corrosion protection element 3 is plugged on, then the field device includes also in the case of this form of embodiment preferably two limiters arranged on the two ends of the region. The two limiters limit axial movement of the corrosion protection element 3 in parallel with the longitudinal axis of the region. Since in this case none of these limiters needs to be removed for a replacement of the corrosion protection element 3, the limiters can also be parts of the component itself. Thus, the component can comprise e.g. a tapered region, on which the corrosion protection element 3 is plugged or clamped. The terminology, tapered region, means here a region, whose cross sectional area is less than the cross sectional area of the regions adjoining on both sides and forming the two limiters.

If a corrosion protection element 1, 3 of the invention e.g. in the case of corresponding dimensioning of the spring force of the spring clamp is secured by clamping on the component, or secured or held in some other manner on the component, e.g. held by force of gravity, then the limiters can be omitted.

A corrosion protection element 3 comprising a spring clamp, or embodied as a spring clamp, offers the advantage that it can, at any time, be mounted externally and subsequently replaced. For this, only the region where the corrosion protection element 3 is mounted, or is to be mounted, must be externally accessible. For this, the field device needs neither to be removed from the location of use, nor is removal of one of the limiters provided in given cases required.

Figure 4:
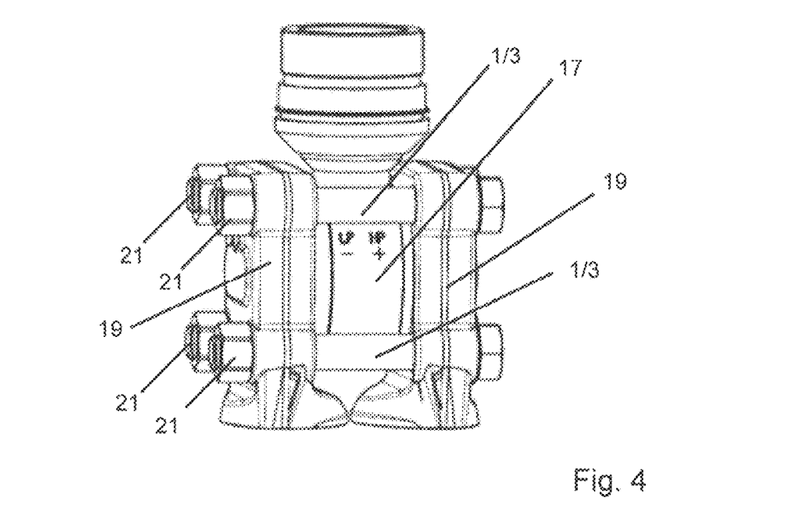
FIG. 4 shows a side view of a pressure difference measuring transducer.
Figure 5:
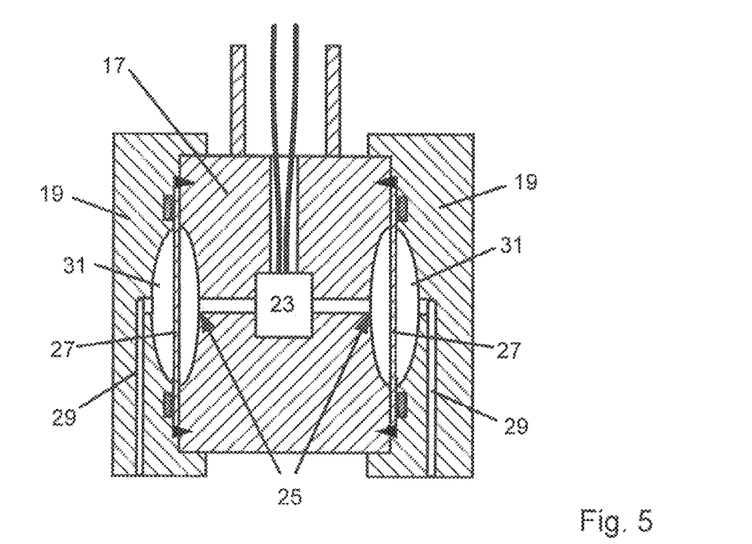
FIG. 5 shows a pressure difference measuring transducer in section.

FIG. 4 shows a side view and FIG. 5 a section of a first example of an embodiment of a field device equipped with at least one corrosion protection element 1, 3. In the case of the field device shown here by way of example, such is a pressure difference measuring transducer. The measuring transducer includes a measuring element 17, which is clamped between two flanges 19 arranged on mutually opposite, external sides of a measuring element body of the measuring element 17. For this, the flanges 19 are connected with one another by screws, or bolts, 21, each of which has a region freely lying between the flanges 19 and thus in contact with the environment of the measuring transducer. Additionally, the measuring transducer includes a pressure difference sensor 23, which is contactable via two diaphragm seals 25 connected before the sensor with, in each case, one of the two pressures, whose difference is to be measured. The diaphragm seals 25 are terminated outwardly, in each case, by an isolating diaphragm 27 welded on a peripheral area of the measuring element body and filled with a pressure transmitting liquid. The pressure loading by the isolating diaphragms 27 occurs, in each case, via a pressure transfer passageway 29 connectable to a differential pressure line. The pressure transfer passageways 29 extend through their flanges 19 to pressure chambers 31 hollowed out in the flanges 19 and facing associated isolating diaphragms 27.

In the case of this field device, the screws 21, as well as preferably also the flanges 19, the measuring element body of the measuring element 17 and the isolating diaphragms 27 are of stainless steel, preferably austenitic stainless steel.

In the case of this example of an embodiment, preferably at least one of the screws 21 forms a component of the field device, on which a corrosion protection element 1, 3 of the invention is placed.

Figure 6:
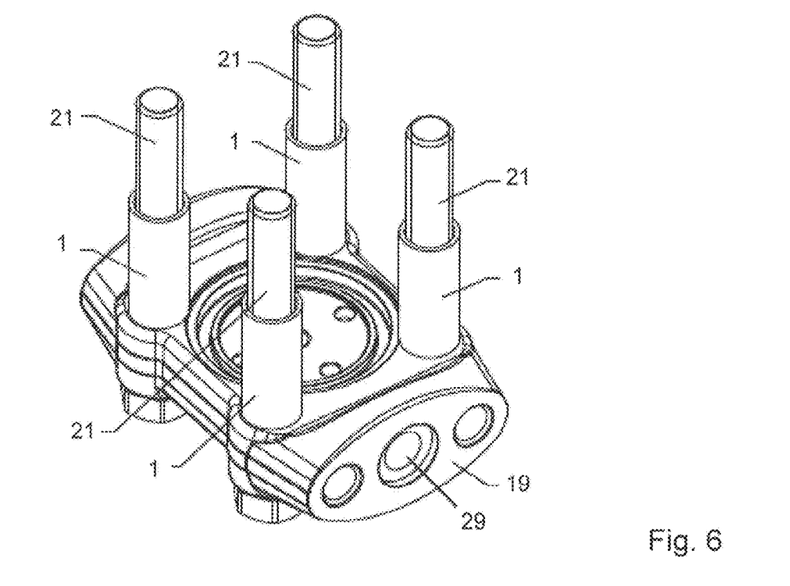
FIG. 6 shows a flange and the screws of a pressure difference measuring transducer together with sleeve-shaped corrosion protection elements slid onto the screws.

FIG. 6 shows, for this, one of the essentially disk shaped flanges 19 of a pressure difference measuring transducer, through whose four openings provided in its corners, in each case, one of the screws 21 passes. Each these screws 21 includes a region exposed in the field device between the two flanges 19, on each of which regions a corrosion protection element 1 comprising a sleeve as illustrated in FIG. 1 can be slid on as shown in FIG. 6. From the module equipped with the slid-on corrosion protection elements 1, the pressure difference measuring transducer is produced by arranging the measuring element 17 and the second flange 19 on the flange 19 illustrated in FIG. 6, with the two flanges 19 being connected with one another by means of the screws 21. Then, each of the two flanges 19 forms one of the limiters provided in the field device for limiting the axial movement of the sleeve in the direction extending in parallel with the longitudinal axis of the component, namely the screw 21.

Figure 7:
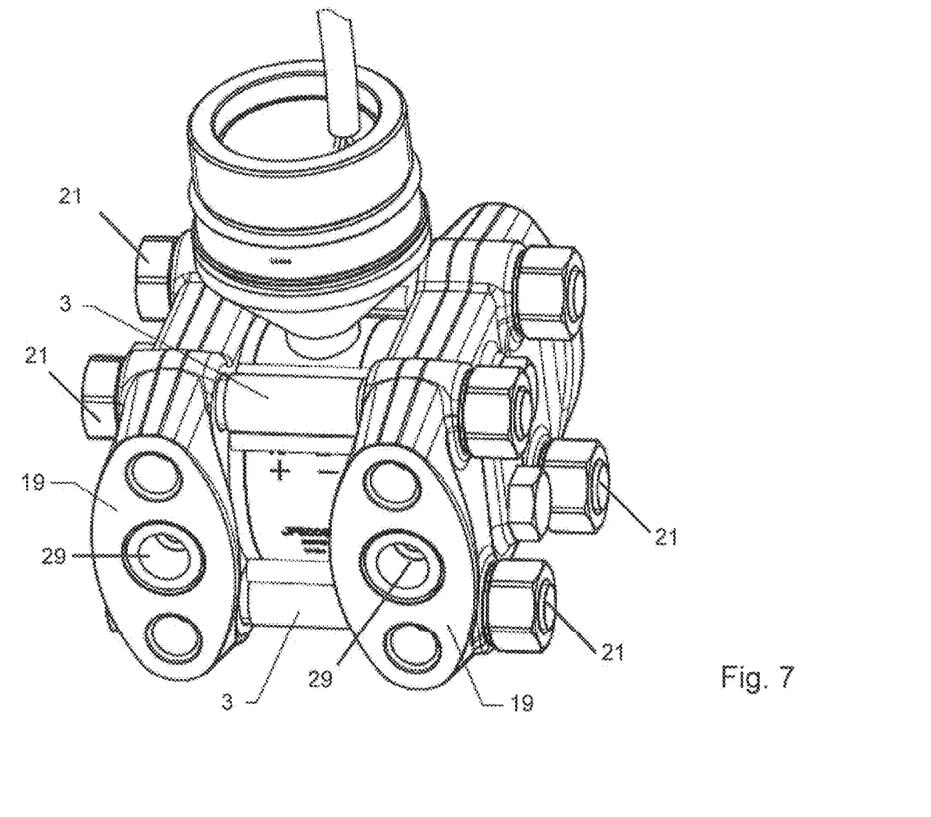
FIG. 7 shows a view of a pressure difference measuring transducer together with spring clamp shaped corrosion protection elements plugged or clamped onto its screws.

FIG. 7 shows a view of an additional pressure difference measuring transducer, in the case of which corrosion protection elements 3 in the form of the spring clamp as illustrated in FIGS. 2 and 3 is placed on the externally accessible regions of the screws 21 lying exposed between the two flanges 19.

The use of at least one of the screws 21 as the component equipped with one of the corrosion protection elements 1, 3 of the invention offers the advantage that via each of these corrosion protection elements 1, 3, in each case, not only the particular screw 21, but, also, simultaneously, all additional components of stainless steel connected electrically conductively with the particular screw 21 and/or the corrosion protection element 1, 3 applied thereon, namely the flanges 19, the measuring element body and the isolating diaphragms 27, are protected against corrosion. Moreover, simultaneously also the welded seams connecting the isolating diaphragms 27 with the measuring element body are protected against corrosion.

Figure 8:
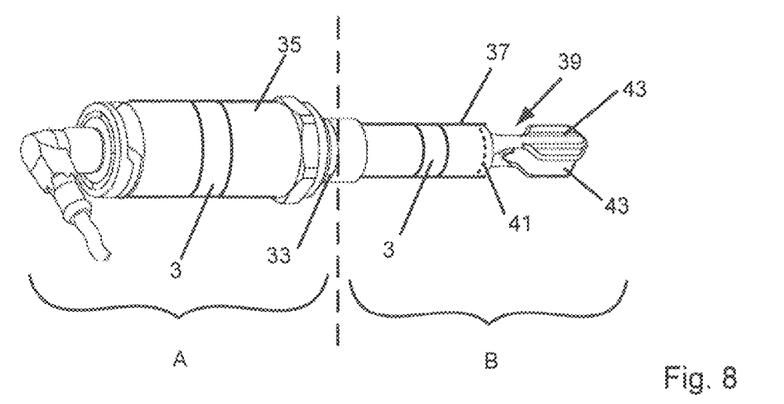
FIG. 8 shows a fill level limit switch.

FIG. 8 shows a view of an additional example of an embodiment of a field device equipped with at least one corrosion protection element 1, 3 of the invention. This field device includes a process connection 33, by means of which it is mountable in an opening of a container (not shown) in such a manner that a first part A of the field device is arranged outside of the container and a second part B of the field device is arranged within the container. Such a manner of installation is usual e.g. in the case of measuring devices, measuring transducers or limit switches for metrological registering, for measuring and/or for monitoring a measured variable of a fill substance contained in the container, e.g. a measured variable such as a fill level, a density or a conductivity of the fill substance. In the case of such field devices, the first part A usually includes a first housing 35, in which e.g. electronic components are accommodated. The second part B includes e.g. an element to be exposed during operation to the measured variable to be registered, measured and/or monitored, i.e. an element such as e.g. a sensor or a probe, or a transmitting- and/or receiving unit, such as e.g. an antenna, with which signals are sent in the direction of the fill substance and/or received after its interaction with the fill substance. The second part B is in use e.g. exposed to a corrosive environment when it contacts a corrosive fill substance or a corrosive vapor phase located above the fill substance.

FIG. 8 shows as an example a fill level-limit switch for determining and/or monitoring the exceeding or subceeding of a fill level predetermined by the installed height of the limit switch in the container. Fill level-limit switches of this type are sold by the applicant under the mark, Liquiphant. The part B of this limit switch to be arranged within the container includes a second housing 37, on whose end a mechanical structure 39 excitable to execute oscillations is arranged. The second housing 37 and the structure 39 can be connected with one another e.g. via an annular, surrounding weld seam 41. Structure 39 includes in the illustrated example of an embodiment two oscillatory tines 43 coupled via a membrane terminating the lower end of the second housing 37 and excitable by means of an electromechanical transducer arranged in the second housing 37 to execute opposite phase oscillations directed perpendicularly to their longitudinal axes. The transducer is connected to an electronics arranged e.g. in the first and/or in the second housing 35, 37, which based at least on one property of the resulting oscillation of the structure 39 registered by the transducer, such as e.g. its frequency and/or amplitude, determines and/or monitors an exceeding or subceeding of the fill level predetermined by the installed height of the limit switch.

In the case of this field device, the first housing 35, the second housing 37, the process connection 33 and/or the structure 39 are of stainless steel, preferably austenitic stainless steel. Insofar, preferably at least one of the housings 35, 37 forms a component of the field device, on which a corrosion protection element 1, 3 of the invention is placed.

FIG. 8 shows, as an example of this, a corrosion protection element 3 plugged or clamped on a housing section of the first housing 35. The corrosion protection element 3 is essentially of construction equal to that of the corrosion protection element 3 illustrated in FIGS. 2 and 3. In this way, the first housing 35 and the process connection 33 are protected against corrosion. This protection is especially advantageous when the housing 35 is applied in a warmer, corrosive environment, such as e.g. an environment containing salt spray, which condenses on the colder housing 35, since then the danger of corrosion of stainless steel, especially austenitic stainless steel, is especially high.

To the extent that reaction products occurring from corrosion of the corrosion protection elements 1, 3 can be tolerated at the location of use in the container, alternatively or supplementally, also the second housing 37 located during operation within the container can be equipped with a corrosion protection element 3 of the invention. FIG. 8 shows, for this, a corrosion protection element 3 plugged or clamped on a housing section of the second housing 37. Here, the corrosion protection element 3 is essentially of equal construction to that of the corrosion protection element 3 illustrated in FIGS. 2 and 3. In this way, the second housing 37, the structure 39 and the process connection 33, as well as also the weld seam 41 are protected against corrosion.

The two housing sections are preferably, in each case, embodied as tapered regions of the respective housing 35, 37, each of which has a cross sectional area, which is less than the cross sectional area of the two regions of the housings 35, 37 adjoining on both sides thereof and forming, in each case, one of the above described limiters.

The invention claimed is:

1. A field device, comprising:
a pressure difference transducer including a measuring element;
a component of stainless steel that contacts an environment of the field device; and
at least one corrosion protection element,
wherein the measuring element is clamped between two flanges connected with one another by screws, wherein the screws extend between the two flanges,
wherein the at least one corrosion protection element is embodied as a sacrificial anode comprising iron or rustable steel and is formed in such a manner that the at least one corrosion protection element can be applied to the component of the field device in such a manner that the sacrificial anode is in electrically conducting contact with the component, and
wherein the at least one corrosion protection element is placed on at least one of the screws in a region between the two flanges and is in contact with the environment.

2. The field device of claim 1, wherein the corrosion protection element is:
slid onto the component, wherein component is elongated and the corrosion protection element is configured as a sleeve or is embodied with a sleeve shape, and wherein the corrosion protection element externally surrounds at least one region of the elongated component; or
plugged or clamped onto the component, wherein component is externally accessible and the corrosion protection element is configured as a spring clamp or is embodied as a one piece, spring clamp shaped, corrosion protection element with two spring legs that grip around at least one region of the component.

3. The field device of claim 2, wherein a limiter is provided on both sides of the region of the component, wherein the limiter is embodied in such a manner that it limits an axial movement of the corrosion protection element in a direction extending parallel with the longitudinal axis of the region.

4. The field device of claim 1, wherein the field device includes at least one further component of stainless steel or a metal more noble than iron or rustable steel protected against corrosion by the corrosion protection element, wherein the further component is in electrically conducting contact with the component equipped with the corrosion protection element or the corrosion protection element mounted on the component.

5. A field device for measuring or for monitoring a measured variable of a fill substance located in a container, the field device comprising:
a part to be arranged outside of the container and a part to be arranged within the container, wherein at least one of the part to be arranged outside of the container and the part to be arranged within the container includes a component embodied of stainless steel and embodied to contact an environment of the field device; and
at least one corrosion protection element,
wherein the at least one corrosion protection element is embodied as a sacrificial anode comprising iron or rustable steel and is embodied to be applied to the component embodied of stainless steel such that the sacrificial anode is in electrical contact with the component embodied of stainless steel, and
wherein the component embodied of stainless steel has a tapered region on which the at least one corrosion protection element is plugged or clamped such that the at least one corrosion protection element externally grips the tapered region, wherein the at least one corrosion protection element is configured as a spring clamp or is embodied as a one piece, spring clamp shaped, corrosion protection element.

\* \* \* \* \*